(12) United States Patent
Hackner et al.

(10) Patent No.: US 10,451,440 B2
(45) Date of Patent: Oct. 22, 2019

(54) DEVICE AND METHOD FOR DETECTING A POSITION OF A POSITION INDICATOR

(71) Applicant: Fraunhofer-Gesellschaft zur Foerderung der angewandten Forschung e.V., Munich (DE)

(72) Inventors: Michael Hackner, Hemau OT Haag (DE); Hans-Peter Hohe, Heiligenstadt (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 583 days.

(21) Appl. No.: 15/167,517

(22) Filed: May 27, 2016

(65) Prior Publication Data

US 2016/0273941 A1    Sep. 22, 2016

Related U.S. Application Data

(63) Continuation of application No. PCT/EP2014/075516, filed on Nov. 25, 2014.

(30) Foreign Application Priority Data

Nov. 28, 2013  (DE) ........................ 10 2013 224 409

(51) Int. Cl.
*G01D 5/14*        (2006.01)
*G01V 3/08*        (2006.01)

(52) U.S. Cl.
CPC .............. *G01D 5/14* (2013.01); *G01D 5/147* (2013.01); *G01V 3/08* (2013.01)

(58) Field of Classification Search
CPC ............. G01D 5/14; G01D 5/147; G01V 3/08
(Continued)

(56) References Cited

U.S. PATENT DOCUMENTS 4,810,965 A    3/1989  Fujiwara et al.
5,841,273 A    11/1998  Muraji et al.
(Continued)

FOREIGN PATENT DOCUMENTS

DE    3742975 A1    7/1988
DE    4033252 A1    4/1992
(Continued)

OTHER PUBLICATIONS

"http://de.wikipedia.org/wiki/Colpitts-Schaltung".
(Continued)

*Primary Examiner* — Reena Aurora
(74) *Attorney, Agent, or Firm* — Perkins Coie LLP; Michael A. Glenn

(57) ABSTRACT

A device for detecting a position of a position indicator includes an electrical magnetic field source, a sensor and an evaluator. The electrical magnetic field source is configured to generate a magnetic field when an electrical current flows through the electrical magnetic field source. The sensor is configured to detect the magnetic field and provide sensor signals based on the magnetic field detected, the sensor having at least two sensors each of which is configured to detect a spatial direction component of the magnetic field and output a signal corresponding to the spatial direction component. The evaluator is configured to receive the sensor signals and determine the position of a position indicator based on the sensor signals when the magnetic field in the surroundings of the electrical magnetic field source is influenced by the position indicator.

22 Claims, 10 Drawing Sheets

(58) Field of Classification Search
USPC .................................................. 324/207.11
See application file for complete search history.

(56) References Cited

U.S. PATENT DOCUMENTS

| | | | | |
|---|---|---|---|---|
| 5,880,586 | A * | 3/1999 | Dukart | G01D 5/145 |
| | | | | 324/207.2 |
| 9,625,535 | B2 * | 4/2017 | Cadugan | G01R 33/06 |
| 2009/0001965 | A1 * | 1/2009 | Ausserlechner | G01D 5/145 |
| | | | | 324/202 |
| 2013/0002255 | A1 * | 1/2013 | Shampine | G01D 5/145 |
| | | | | 324/326 |

FOREIGN PATENT DOCUMENTS

| | | |
|---|---|---|
| DE | 19908473 A1 | 9/2000 |
| DE | 19943128 A1 | 4/2001 |
| DE | 19954360 A1 | 5/2001 |
| DE | 10303363 A1 | 8/2004 |
| DE | 102005042050 A1 | 3/2006 |
| DE | 102005045774 A1 | 4/2007 |
| DE | 202011109077 U1 | 5/2013 |
| EP | 0580207 A1 | 1/1994 |
| EP | 1436849 A2 | 7/2004 |
| EP | 1438755 A1 | 7/2004 |
| EP | 2165159 A1 | 3/2010 |
| WO | 2006035350 A1 | 4/2006 |

OTHER PUBLICATIONS

"http://elektroniktutor.de/signalkunde/hartley.html".
"http://www.ams.com/eng/Products/Magnetic-Position-Sensors/3D-Absolute-Position-Sensors/AS5410".
"http://www.infeneon.com/cms/de/product/sensors-and-wireless-control/magnetic-sensors/magnetic-speed-sensors/integrated-back-bias-ibb/channel.html?channel=db3a30433b47825b013b8f53d1257628".
"http://www.ni.com/wihite-paper/3638/en", Mar. 26, 2013.
Kucera, Gerd , "Weg und Abstandssensoren; Drei verschleissfrei arbeitende Sensorsyteme zur Linearen Wegerfassung", Electronik Praxis, Aug. 5, 2008.
"Austriamicrosystems", All-in-One with 3D Hall AS5410 A New Dimension in Absolute 3D Position Sensing, May 4, 2011, 1-2.
"Austriamicrosystems", AS5410 3D-Hall Encoder Absolute Linear—Data Sheet, Nov. 20, 2012, 1-28.

* cited by examiner

DEVICE AND METHOD FOR DETECTING A POSITION OF A POSITION INDICATOR

CROSS-REFERENCE TO RELATED APPLICATIONS

This application is a continuation of copending International Application No. PCT/EP2014/075516, filed Nov. 25, 2014, which is incorporated herein by reference in its entirety, and additionally claims priority from German Application No. 10 2013 224 409.6, filed Nov. 28, 2013, which is also incorporated herein by reference in its entirety.

BACKGROUND OF THE INVENTION

The invention relates to a device for detecting a position of a position indicator which influences a magnetic field generated by an electrical magnetic field source. Additionally, the invention relates to a method for detecting a position of a position indicator using such a device.

When constructing large machines or automobiles or in automated systems and apparatuses, the object of having to measure the position or orientation of parts of the machine or the motor vehicle frequently arises. For reasons of lifetime, reliability and easy mounting, contactless methods and/or magnetic measuring systems, such as, for example, magnetic position indicators, are frequently used since these operate in a contactless manner and, thus, free from wear. A permanent magnet is usually fixed to a movable machine part and a magnetic field sensor fixed at a fixed, i.e. stationary, location. When the magnet moves, this change may be determined using a change in the magnetic field at the location of the sensor.

The temperature dependency of the measurement is of disadvantage in these assemblies since both the magnetic field of the permanent magnet and the sensitivity and offset of the sensor are largely dependent of the temperature. These effects may be attenuated by complicated correction measures. Using 3D measuring methods, as are described, for example, in [1], the dependency on the sensitivity of the sensor and the magnetic field of the permanent magnet may be eliminated systematically. However, the offset of the sensors still has to be corrected in a complicated manner.

Another disadvantage is the dependence on disturbing magnetic fields superimposed on the field of the permanent magnet. These may be either the Earth's magnetic field or strong magnetic fields in industrial plants, such as, for example, aluminum works, or magnetic fields close to electromagnets, for example on scrap yards. However, smaller disturbing fields caused by electrical currents or magnetic materials close to the measuring assembly may also have negative effects on the measuring precision. This may be avoided by a spatially differential (gradient) evaluation of several sensor signals in homogenous disturbing fields. However, for inhomogeneous disturbing fields, the influence by a gradient measurement may only be attenuated, but not eliminated completely.

In modern systems of linear position measurement, two (sometimes even more) 3D magnetic field sensors are mostly used apart from the permanent magnet to achieve independence on temperature and external fields. A temperature-stable position measurement may be achieved by evaluating the direction of the field lines, instead of the magnitude of the magnetic field string. External fields present may be easily suppressed by using gradients so that position measurements relatively safe from disturbances may be achieved, even without magnetic shielding.

An example of the state of elements, available on the market at present, including a permanent magnet as a position indicator and a sensor-integrated circuit (sensor IC) having at least two 3D magnetic field sensors is illustrated in FIG. 6.

FIG. 6 shows a schematic illustration of a device 64 for linear position measurements having 3D magnetic field sensors for recognizing the position of a body 12' in a permanent magnetic field 16'. The permanent magnetic field 16' is generated by a permanent magnet 44 arranged at a movable element 32. An evaluating means 18' comprises five sensors 22a-e configured to detect the permanent magnetic field 16' in three spatial directions each. The sensors 22a-e are arranged on a board, for example on or in a sensor ASIC, in the shape of a cross. This means that sensors 22a, 22b, 22d, and 22e are each arranged equidistantly in a positive and negative x and z directions around the sensor 22c. Based on the equidistant and defined arrangement of the sensors 22a-e, movement of the mobile element 32 or the permanent magnet 44 may result in variable magnetic field lines or gradients of the permanent magnetic field 16'. The variable orientation of the magnetic field lines or gradients of the permanent magnetic field 16' may be determined in each of the sensors 22a-e so that a position of the permanent magnet 44 may be concluded based on the defined distances between the sensors 22a-e. A temperature-independent variation of, possibly, improved external fields may be realized already using two, but also more 3D sensors 22a-e, as is described, for example, in [1].

In principle, magnetic fields generated by a permanent magnet and, thus, representing DC magnetic fields may be superimposed by external DC magnetic fields, like the Earth's magnetic field. Suppressing such external magnetic fields may be more complicated in a DC magnetic field which is used for determining positions such that the result may be a deteriorated suppression of disturbing fields. In addition, using permanent magnets for generating the permanent magnetic field 16' may result in the fact that the permanent magnet 44, when being mounted, for example, to a movable element 32, has to be placed and oriented while keeping position tolerances. Thus, a translatory tolerance may induce only small problems, whereas a rotational tolerance, for example, in particular with a ball, may entail greater problems. In other words, when producing a sensor system, mechanical tolerances arise which may also have an effect on the measuring precision. In many systems, such tolerances are corrected by system calibration. For mechanical mounting, a ball magnet is particularly problematic since the axis of magnetization is not characterized by the geometrical shape of the magnet. In ball magnets, it may consequently be necessitated to specify a magnetic orientation device which orients the magnet correctly relative to the rest of the assembly.

Additionally, permanent magnets may be too expensive, in particular as regards materials becoming ever more expensive, like rare earths.

Linearly variable differential transformers (LVDTS), as are described, for example, in [2], may make use of coil coupling between a primary coil and two secondary coils over a magnetizable core or moveable in one degree of freedom, which is able to move linearly within the coil. A superposition of output voltages of the secondary coils phase-shifted by 180 degrees shows a varying output signal of the LVDT device, depending on the position of the indicator body i.e. the magnetizable core. Ferroinductive displacement transducers, as are, for example, described in [3], exhibit a similar mode of functioning.

Magneto-inductive principles, as are described, for example, in [3], may comprise a coil having a softly magnetizable core. The coil may exhibit a strong change in inductivity when the core is saturated by an indicator magnetic field. With a movement of the position indicator in one degree of freedom, the portion of the saturated material is position-dependent. The movement indicator here is a permanent magnet. Superimposing fields may disturb the measuring principle, which does not allow ideal suppression of disturbing fields.

Inductive analog distance sensors, as are described, for example, in [3], use a change in inductivity of the coil and, thus, a change in the resonant frequency of an oscillating circuit in which the coil is arranged when approximating a magnetizable material, wherein the measuring principle allows movement in one degree of freedom.

Principles, as are used, for example, in sound pickups for guitars, comprise a permanent magnet which magnetizes the strings of the guitar. A coil detects a magnetic field of the strings moved so that a magnetically induced voltage may be transferred to loudspeakers via an amplifier.

A device comprising a constant backbias (permanent) magnet having a magnetizable gear wheel is shown in [4]. Such devices do not allow ideal suppression of disturbing fields.

A device allowing the position of an element to be determined irrespective of external magnetic fields would be desirable.

The object underlying the present invention is providing a device and a method allowing the positions of bodies to be detected in a more robust, space-saving, i.e. small, and cheaper manner.

SUMMARY

According to an embodiment, a device for detecting a position of a position indicator may have: an electrical magnetic field source configured to generate a magnetic field when an electrical current flows through the electrical magnetic field source; sensor means configured to detect the magnetic field and provide sensor signals based on the magnetic field detected, the sensor means having at least two 3D sensors each of which is configured to detect three spatial direction components of the magnetic field and output a signal corresponding to the respective spatial direction component; evaluating means configured to receive the sensor signals and determine the position of the position indicator based on the sensor signals when the magnetic field in the surroundings of the electrical magnetic field source is influenced by the position indicator; wherein the evaluating means is configured to differentially measure, for determining the position of the position indicator, the magnetic field using the sensor signals of the at least two 3D sensors.

According to another embodiment, a system may have a device for detecting a position of a position indicator as mentioned above and an element movable relative to the sensor means or the electrical magnetic field source, the movable element being connected to the position indicator or the movable element being the position indicator; wherein the position indicator has greater a distance to the electrical magnetic field source than to the sensor means.

According to another embodiment, a system may have a device for detecting a position of a position indicator as mentioned above and an element movable relative to the sensor means or the electrical magnetic field source, the movable element being connected to the position indicator or the movable element being the position indicator; wherein the sensor means has greater a distance to the electrical magnetic field source than a distance between the sensor means and the position indicator.

Another embodiment may have a system having a device for detecting a position of a position indicator as mentioned above, wherein the sensor means and the electrical magnetic field source are arranged in a common casing.

According to another embodiment, a device for detecting a position of a position indicator may have: an electrical magnetic field source generating a magnetic field when an electrical current flows through the electrical magnetic field source; sensor means configured to detect a magnetic field and to provide sensor signals based on the magnetic field detected, the sensor means having at least two Hall sensors for detecting three spatial direction components of the magnetic field influenced by the position indicator, the sensors being configured to output a signal corresponding to the respective spatial direction component; evaluating means configured to receive the sensor signals and determine the position of the position indicator based on the sensor signals when the magnetic field in a surroundings of the electrical magnetic field source is influenced by the position indicator.

According to another embodiment, a method for detecting a position of a position indicator may have the steps of: generating a magnetic field by means of an electrical current; detecting three spatial direction components of the magnetic field and providing sensor signals corresponding to the respective spatial direction components based on the magnetic field detected; receiving the sensor signals and determining the position of the position indicator based on the sensor signals by differentially measuring the magnetic field using the sensor signals of the at least two 3D sensors.

The central idea of the present invention is having recognized that a magnetic field generated by means of an electrical current in an electrical magnetic field source is influenced by a position indicator located in a surroundings of the electrical magnetic field source in the electrically generated magnetic field, the influence may be detected using sensor means and be determined using evaluating means such that the position of the position indicator may be determined based on the influence of the electrically generated magnetic field.

Embodiments of the present invention provide a device having an electrical magnetic field source for generating a magnetic field, sensor means configured to detect the magnetic field and provide sensor signals based on the magnetic field detected. In addition, embodiments comprise evaluating means configured to receive the sensor signals and determine the position of a position indicator based on the sensor signals when the magnetic field in the surroundings of the electrical magnetic field source is influenced by the position indicator.

Of advantage with these embodiments is the fact that, based on an electrical generation of the magnetic field, generation of the magnetic field by permanent magnets may be dispensed with.

When the magnetic field flows through the position indicator, i.e. when the position indicator is located within the magnetic field, the position indicator is magnetized itself or a magnetic secondary field is generated based on an electrical current induced in the position indicator. The secondary field superimposes the magnetic field of the electrical magnetic field source in accordance with superposition rules such that the magnetic field is influenced based on the position of the position indicator. Said influence may be determined by means of the sensor means and the evaluating means so that a position of the position indicator may be determined. The device is miniaturizable. An electrical magnetic field source is controllable and/or adaptable compared to a permanent magnet so that the magnetic field is also controllable and/or adaptable. In addition, an electrical magnetic field source may be provided cheaper than a permanent magnet.

In accordance with another embodiment, a device includes an electrical energy source configured to provide the electrical magnetic field source with an electrical alternating voltage such that a magnetic alternating field is generated by the electrical magnetic field source when the electrical alternating voltage is applied to the electrical energy source. A magnetic alternating field the polarity of which changes over frequency may be of advantage when compensating external magnetic fields.

In embodiments, the evaluating means is configured to exclude, i.e. compensate, a disturbing external field based on a lock-in method or a chopper method and determine the position of the position indicator based on the lock-in method or the chopper method.

It is of advantage with this embodiment that small changes of the magnetic field to be measured may be determined by the position indicator based on the lock-in method or the chopper method.

Further embodiments show a system having a device for detecting a position of a position indicator and an element movable relative to the control means or the electrical magnetic field source, which is connected to the position indicator or in which the movable element is the position indicator and in which the sensor means has greater a distance to the electrical magnetic field source than a distance between the sensor means and the position indicator. Thus, a position of the element of the device or position indicator may be detected and an operating state of the system be monitored, for example.

It is of advantage with these embodiments that smaller sensor dynamics and, thus, lower evaluating frequencies may be used, based on a distance of the electrical magnetic field source to the sensor means which is large compared to the sensor indicator, based on relatively strong influences on the magnetic field by the position indicator.

Another embodiment shows a system having a device for detecting a position of a position indicator and an element movable relative to the control means or the electrical magnetic field source, which is connected to the position indicator or in which the movable element is the position indicator and in which the position indicator has greater a distance to the electrical magnetic field source than to the sensor means.

It is of advantage with this embodiment that the sensor means and the electrical magnetic field source may be arranged to be mutually neighboring so that an easy connection can be made between the sensor means and the electrical magnetic field source so that synchronization of an evaluating clock and driving of the electrical magnetic field source are made easier.

An alternative embodiment shows a system having a device for detecting a position of a position indicator, wherein the sensor means and the electrical magnetic field source are arranged in a common casing.

It is of advantage with this embodiment that an arrangement in a common casing allows an arrangement of the sensor means and the electrical magnetic field source in a constant relative position to each other so that calibration of the sensor means to the magnetic field generated by the electrical magnetic field source may be allowed and the sensor means and/or the electrical magnetic field source may be protected from mechanical damage.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
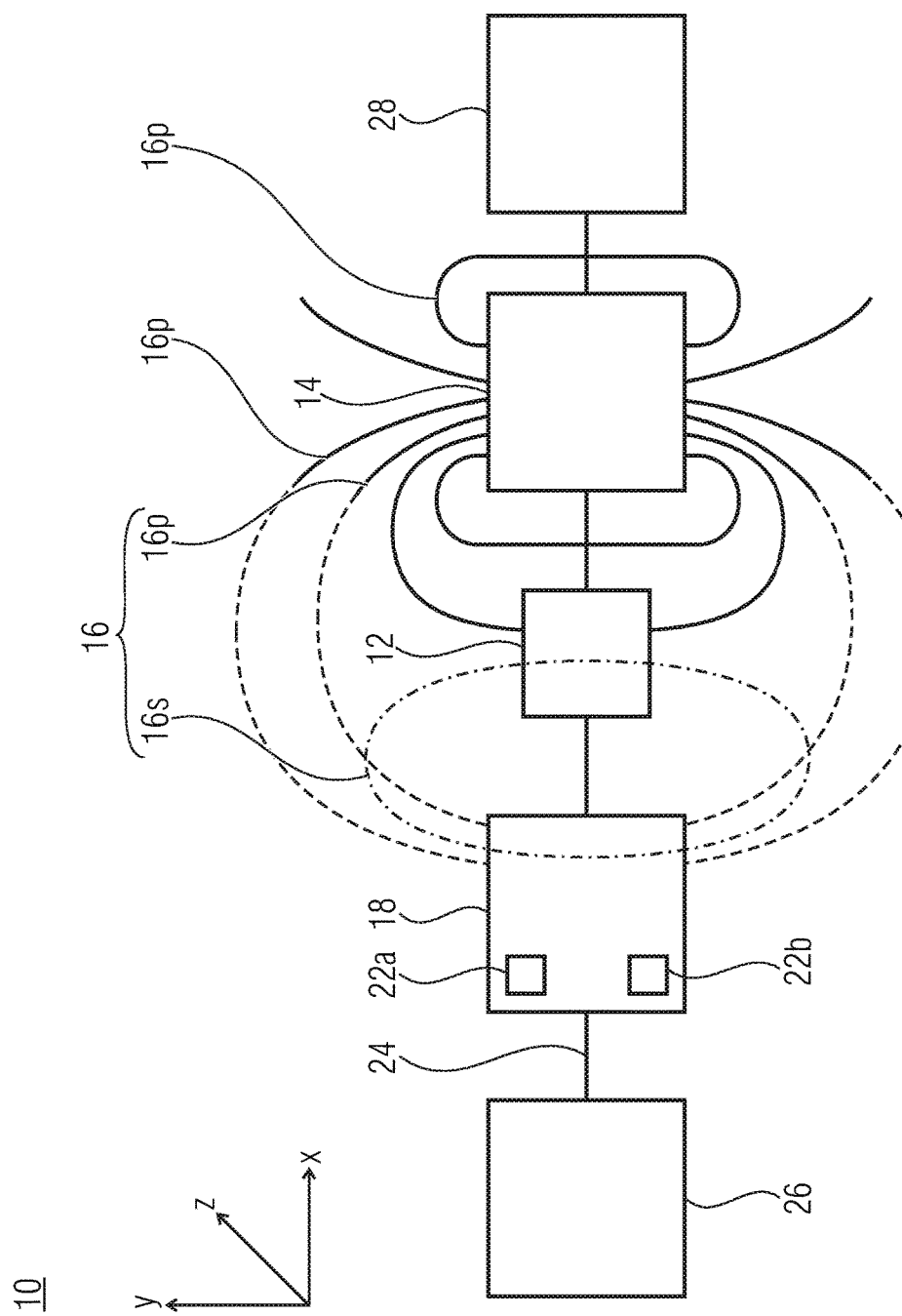
FIG. 1 shows a schematic block circuit diagram of a device for detecting a position of a position indicator.

Before discussing in greater detail below embodiments of the present invention making reference to the drawings, it is pointed out that identical elements, objects and/or structures or those of equal function or equal effect are provided with same reference numerals in the different figures such that the description of these elements illustrated in different embodiment is mutually exchangeable and mutually applicable.

FIG. 1 shows a schematic block circuit diagram of a device 10 for detecting a position of a position indicator 12. The position indicator 12 may, for example, be a body which is formed at least partly from ferromagnetic materials.

Alternatively or additionally, the position indicator 12 may be an electrically conductive object, like a short-circuited electrical coil. The ferromagnetic material may, for example, be iron, nickel, and/or cobalt. Alternatively or additionally, the position indicator 12 may comprise ferromagnetic alloys, like, for example, a permalloy ($Ni_{80}$ $Fe_{20}$) formed from nickel (Ni) and iron (Fe), super-alloy which, compared to the permalloy, additionally comprises molybdenum, metallic glasses on an iron or cobalt base, or other alloys.

The device 10 includes an electrical magnetic field source 14 configured to generate a magnetic field 16 when an electrical current flows through the electrical magnetic field source 14. The electrical magnetic field source 14 may be an electrically conductive structure, like a straight, curved, or bent conductor or a coil. The electrical magnetic field source 14 may comprise a coil core for increasing the magnetic flux when the electrical magnetic field source 14 is a coil.

In other words, the magnetic field 16 comprises the primary portion 16p and the optional secondary portion 16s, wherein a superposition of portion 16p and 16s forms the magnetic field 16. When the position indicator comprises ferromagnetic materials, for example, orientation of the Weiss areas or domains in the position indicator 12 takes place based on the primary magnetic field 16p so that the magnetic field 16 as a whole is also generated by the electrical magnetic field source 14. When the position indicator 12 is a short-circuited electrical coil, for example, an electrical current resulting in the secondary magnetic field 16s to be generated is induced therein at least for a short term when detected by the magnetic field 16p. The superimposing secondary magnetic field 16s generated at least for a short term by the short-circuited coil may thus comprise the shape of a magnetic field as is generated by a dipole. Consequently, the short-circuited coil may be detectable in space as a dipole with an orientation such that an orientation of a short-circuited coil in space may be concluded based on the evaluation in the evaluating means 26.

When there is no position indicator 12, the magnetic field 16 may also include the primary magnetic field 16p only. When the position indicator 12 is located in the primary magnetic field 16p generated by the electrical magnetic field source 12, the position indicator 12 may generate a secondary magnetic field 16s which superimposes the primary magnetic field 16p. Presence of the position indicator 12 in the primary magnetic field 16p may render a changed magnetic field 16, i.e. superimposed by the secondary magnetic field 16s, measurable at the sensor means 18.

In other words, the magnetic field 16 of the coil 14 changes at the location of the sensor 18 in dependence on the current sent through the coil 14.

In addition, the device 10 includes sensor means 18 which comprises two or more sensors 22a and 22b and is configured to detect the magnetic field 16 and provide sensor signals 24 based on the magnetic field 16 detected. Each of the at least two sensors 22a and 22b is configured to detect a spatial direction component of the magnetic field 16 and output a signal corresponding to the respective spatial direction component. The spatial direction component may, for example, be an x, y, and/or z component of the magnetic field 16. The sensors 22a and 22b may be spaced apart from each other spatially and configured to detect the same spatial direction component or mutually different spatial direction components. Alternatively, the sensors 22a and 22b may also be arranged at a common position and configured to detect two mutually different spatial direction components. This may, for example, take place by arranging two or more Hall sensors mutually offset from one another, for example perpendicularly to one another, such that each of the Hall sensors may detect a spatial direction component of the magnetic field 16. Alternatively, the sensor means may also comprise several sensors.

Hall sensors may, for example, be sensors as are described in DE19908473, DE19943128, DE19954360, EP1436849 or EP14389755.

The device 10 additionally includes evaluating means 26 configured to receive the sensor signals 24 and determine the position of the position indicator 12 based on the sensor signals 24 when the magnetic field 16 is influenced by the position indicator 12 in the surroundings of the electrical magnetic field source 14.

Based on the spatial distance between the sensors 22a and 22b and the spatial distance between the electrical magnetic field source 14 and the position indicator 12, the superimposing effects of the secondary field 16s may be mutually different at the locations of the sensors 22a and 22b such that the evaluating means 26, such as, for example, a measuring device or computer, is able to determine a position of the position indicator relative to the sensor means 18 or the electrical magnetic field source 14.

The position indicator 12 here is located outside the electrical magnetic field source 14 and may be arranged to be movable relative to each or both of the sensor means 18 and/or the electrical magnetic field source 14 in an x direction, a y direction and/or a z direction one-dimensionally, i.e. along a straight line, two-dimensionally, i.e. in a plane, or three-dimensionally, i.e. in three spatial directions.

The position indicator 12 may, for example, be an element or device of a system, like in machine tools, a pump or other devices in which a position of an element, like a milling spindle or a pontoon in a device for measuring fluid streams, is to be measured in a contactless manner. Thus, the position indicator 12 or its magnetizable components, materials or coils may comprise any shape, such as, for example, a cuboid, an oval, an ellipse, or a ball. Additionally, the position indicator 12 may be connected to the element of the system the position of which is to be detected, or form the element partially or completely.

In other words, the device 10 may also be described to be an arrangement for measuring the position in one, two or three spatial directions, consisting of one or several magnetic field sensor means and a position indicator characterized in that the position indicator is not a permanent magnet but consists of a position indicator and a coil for magnetizing or remagnetizing ferromagnetic materials or coil elements. The device 10 may, among other things, be used for a translatory or, maybe, even rotary 1D, 2D and/or 3D position measurement, like in industry, in the automobile sector or mechanical engineering. In this way, the position of the indicator body or coil relative to the sensor may be determined. A magnetizing frequency may be selected flexibly such that, apart from a direct current (DC) field, any frequency may be set. This may result in an improved suppression of disturbing fields, such as, for example, inhomogeneous DC fields, the influence of which may, for example, be eliminated by a lock-in or chopper method.

Complicated spinning-current drivers and circuits may be dispensed with when using a "true" magnetic "chopper". A sensor and analog signal processing offset may be suppressed systematically based on the chopper.

Thus, the device 10 comprises a universal mode of functioning. Which of the components among the position indicator 12, the electrical magnetic field source 14 and the sensor means 18 is/are fixed relative to one another or moveable may be implemented basically as desired. Thus, only the position indicator 12 or the electrical magnetic field source 14 or the electrical magnetic field source 14 and the position indicator 12 together may be moved relative to the sensor means 18. Thus, it is possible to detect a position of components moved relative to the sensor means 18, or a component thereof, i.e. of the position indicator 12 or the electrical magnetic field source 14 or the electrical magnetic field source 14 and the position indicator 12 together. Alternatively, the relative movement may also take place such that the sensor means 18 is moved relative to the position indicator 12, or to the electrical magnetic field source 14 or to the position indicator 12 and the electrical magnetic field source 14 together so that the position of the sensor means 18 relative to respective unmoved components is determined.

Alternatively, the position indicator and/or the electrical magnetic field source may be moved relative to the sensor means. This allows determining the position of the position indicator or the electrical magnetic field means relative to the sensor.

In other words, the position indicator 12 distorts the field 16p of the coil 14 in dependence on its relative position relative to the coil 14 and the sensor means 18. Thus, the distortion provides the actual signal for the position measurement.

When the position indicator 12 is configured to emit or distort the magnetic field symmetrically in the spatial directions detected by the sensors, orienting the indicator relative to the electrical magnetic field source 12 and/or the sensor means may be dispensed with. This may, for example, be realized in the form of a round ferromagnetic body or coils arranged perpendicularly to one another.

Alternatively, orientation of the position indicator 12 relative to the sensor means 18 and/or the electrical magnetic field source 14 may be omitted when a position or change in position of the position indicator 12 is to be recognized only in one or two dimensions and the distortions of the magnetic field generated by the position indicator exhibit a symmetrical shape relative to directions of movement of the position indicator 12. Exemplarily, a ferromagnetic body may comprise a cylindrical shape or the shape of a cube the center point axis of which is oriented along a one-dimensional direction of movement. Alternatively, it is conceivable for the position indicator 12 to comprise, for example, the shape of a round disk the main sides of which are oriented in parallel to a two-dimensional plane of movement of the position indicator 12.

An electrical energy source 28 is connected to the electrical magnetic field source 14 and configured to provide an electrical current to the electrical magnetic field source 14, the current causing the magnetic field 16 to be generated in the electrical magnetic field source 14.

The electrical energy source 28 may be configured to provide a direct current of essentially constant amplitude and/or sign to the electrical magnetic field source 14. Thus, the electrical magnetic field source 14 may generate the magnetic field 16 such that the position indicator 12 is magnetized differently in dependence on its position relative to the electrical magnetic field source 14 when the position indicator 12 comprises ferromagnetic materials, for example, or induction takes place in dependence on the position. This means that gradients of the magnetic field 16 or the primary magnetic field 16p may be mutually different depending on a relative position of the position indicator 12 relative to the electrical magnetic field source 14. This may, for example, result in a mutually different orientation of the Weiss areas or induction of different extent and, thus, mutually different orientation of the secondary field 16s such that the magnetic field 16 is influenced differently based on different positions of the position indicator 12.

In other words, the sensor means 18 or each of the sensors 22a and 22b sees a magnetic field 16 which is distorted differently by the position of the position indicator 12 and thus allows drawing conclusions as to the position of the position indicator 12.

Alternatively or additionally, the electrical energy source 28 may be configured to provide a direct current of alternating sign (alternating direct current) to the electrical magnetic field source 14. The magnetic field 16 may, based on a direct current of alternating sign, be an alternating field of alternating polarization direction. An alternating field of alternating polarization direction may allow external disturbing influences to be compensated. External disturbing influences may be direct fields, such as, for example, the Earth's magnetic field, or fields of an electro or permanent magnet, or alternating fields, like those generated by neighboring apparatuses or systems, for example a welding device or electromagnet.

The evaluating means 26 may be configured to exclude, using a type of lock-in or chopper method, a potentially disturbing external field from a differential measurement of the magnetic field 16 with an exciter current of positive or negative sign at the electrical magnetic field source 14. With a differential measurement of the magnetic field 16, direction components of the sensors 22a and 22b, for example, may be subtracted from each other to obtain a difference from which may be obtained information on the position of the position indicator 12. Based on calculating a difference between measuring values of the sensors 22a and/or 22b, with different polarizations of the magnetic field 16, external magnetic fields may be recognized and compensated.

Alternatively or additionally, the electrical energy source 28 may be configured to provide an alternating current to the electrical energy source 14. Compared to driving the electrical magnetic field source 14 using a direct current or an alternating direct current, driving the electrical magnetic field source 14 using an alternating current may be of advantage, for example when the electrical magnetic field source 14 is connected to an electrical capacitor having a capacitance. The electrical capacitor and the electrical magnetic field source may form an inductance (L)-capacitor (C) oscillating circuit (LC oscillating circuit) when the electrical magnetic field source comprises an inductance. If a frequency of the alternating current is basically equal to a resonant frequency of the LC oscillating circuit, same may be excited at this resonance frequency by the electrical energy source 28. The LC oscillating circuit, also referred to as LC oscillator, may, for example, be a Colpitts oscillator, as is, for example, illustrated in FIG. 8 and described in [5], a Hartley oscillator, as is, for example, described in [6], or any other oscillator circuit.

In other words, the sensor means 18 may be operated synchronously to the oscillator (LC oscillating circuit) in order to extract the position signal from the magnetic alternating field 16 in the lock-in method or chopper method. The resulting output signals of the sensors 22a and 22b or the sensor means 18, after the lock-in method or after chopper demodulation, are equal or similar to the known methods with permanent magnets as position indicators and may thus be processed in the same way in order to determine the position of the position indicator 12.

Similarly, in this context this means that signals may differ compared to known methods by the remagnetization not occurring with permanent magnets. When operating the electrical magnetic field source 14 using an alternating direct current or alternating current, remagnetization of the position indicator 12 takes place. Thus, apart from the maximum values of magnetization which, for short periods of time, may be identical to magnetizing a permanent magnet, transition and settling processes of magnetization may result, which does not occur with permanent magnets. When signal portions are also detected during remagnetization, a similar signal may be detected instead of a signal equal to known methods.

Such a resonant operation of the electrical magnetic field source 14 may result in the fact that only the power loss of the oscillating circuit has to be compensated in a continuous, i.e. ongoing or continual operation, and the device may be operated in an energy-efficient manner. That power loss includes ohmic losses in the oscillating circuit, for example, like in the windings of the coil, when the electrical magnetic field source 14 is a coil, emission losses of the magnetic field 16 and/or remagnetization losses in the coil and/or the position indicator 12 when same comprises ferromagnetic materials. When the electrical magnetic field source 14 is a coil and when the coil comprises a coil core for amplifying the magnetic flux, remagnetization losses may also occur in the coil core.

In contrast to operating the electrical magnetic field source 14 using a direct current or alternating direct current, an energy for generating the magnetic field 16, i.e. the exciter field, may be reduced since the current for the electrical magnetic field source 14 does not or only partly have to be provided by the supply voltage, i.e. be provided by the electrical energy source 28. The electrical capacitor may also be used as an energy storage for latching and providing in the next period electrical energy which would have to be compensated or destroyed when operating the electrical magnetic field source using an alternating direct current, for example, when reversing the poles of the magnetic field.

Compared to driving or exciting the electrical magnetic field source 14 using a direct current, an alternating field as is obtained by an alternating direct current or alternating current may remain undisturbed by external fields present, since a frequency of the alternating field allows differentiation to constant magnetic fields, like the Earth's magnetic field. Adjusting the operating frequency and/or the resonant frequency of the electrical magnetic field source 14 additionally allows differentiating the magnetic field 16 as regards the operating frequency from maybe disturbing alternating fields in the surroundings of the device.

Synchronism of driving the electrical magnetic field source 14 and the sensor means 18 may, for example, take place such that measuring values are detected using the sensor means 18 in a phase-locked manner relative to driving the electrical magnetic field source 14. This means that, when driving using an alternating direct current or alternating current, for example, a certain, maybe integral, number of measuring values are detected while driving using the positive current and, when driving using a correspondingly negative current, the certain number of measuring values are also detected. Expressed in a simplified manner, this means that detecting the measuring values takes place while knowing the polarity and/or the amplitude of the current exciting the electrical magnetic field source 14.

Alternatively, the measuring values may also be detected continuously and be associated to a polarity such that a phase-synchronous evaluation of the measuring results may take place, for example by means of a fast Fourier transformation (FFT). Thus, a fixed number of measuring values each may be detected per period of time in which the electrical magnetic field source is driven using a current of positive and/or negative sign. The measuring values may be associated to the sign of the current. A differential measurement of the magnetic field 16 may take place such that a difference of the measuring values or intermediate results which are based on the measuring values is calculated such that this allows drawing conclusions as to the presence of disturbing external magnetic fields and excluding same in further results.

It is of advantage with this embodiment that using permanent magnets for generating a magnetic field may be dispensed with and at the same time measurements which may be uninfluenced or influenced only insignificantly relative to disturbing external magnetic fields may be performed. In addition, a device 10 allows detecting a body in an electrically generated magnetic field, even outside the coil interior, which is restricted in LVDT sensors, for example.

Figure 2:
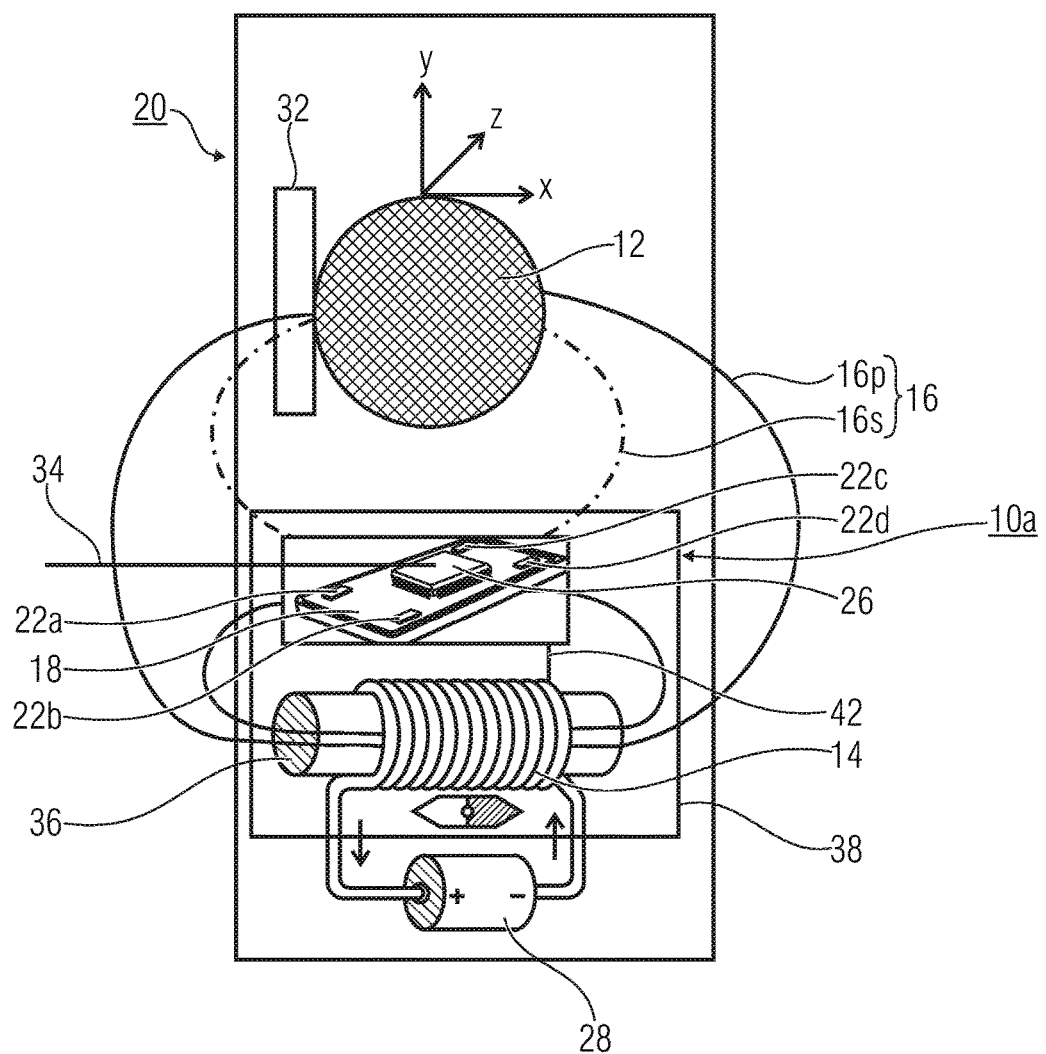
FIG. 2 shows a schematic illustration of a system having a device for detecting a position of the position indicator, wherein sensor means is arranged between the position indicator and an electrical magnetic field source.

FIG. 2 shows a schematic illustration of a system 20 comprising a device 10a for detecting a position of the position indicator 12. The system 20 may, for example, be a flow-through controller for a volume flow. The system 20 includes a moveable element 32, like a valve. The position indicator 12 is connected to the moveable element 32. Alternatively, the position indicator 12 may also comprise a form of the moveable element, like the valve, so that the position indicator 12 is the moveable element 32 of the system 20. The moveable element 32 is arranged to be moveable relative to a device 10a in three spatial directions along an X, Y and Z direction.

The sensor means 18 comprises four sensors 22a, 22b, 22c, and 22d which are arranged to be mutually spaced apart on a board of the sensor means 18. The evaluating means 26 is implemented as an integrated circuit (IC) as a chip and arranged on the board together with the sensors 22a-d. The evaluating means 26 is configured to receive the sensor signals of the sensors 22a-d. The evaluating means 26 is additionally configured to output a position signal 34 which indicates a position of the position indicator 12 and, thus, of the moveable element 32.

The electrical energy source 28 is, for example, represented as a battery or energy source of constant polarity. The electrical magnetic field source 14 is implemented as a coil and comprises a core 36 configured to amplify a magnetic flux of the coil, i.e. of the electrical magnetic field source 14.

The sensor means 18, the evaluating means 26 and the electrical magnetic field source 14 are arranged in a common casing 38. The casing 38 is oriented relative to the system 20 such that the position indicator 12 has greater a distance to the electrical magnetic field source 14 than to the sensor means 18. This means that the sensor means 18 is arranged between the position indicator 12 and the electrical magnetic field source 14.

In other words, the position indicator is located in direct proximity to the sensor. The coil may be connected directly to an exciting circuit integrated in the sensor ASIC and may be cast as a common unit. Due to the proximity of indicator and sensor, the stray field of the indicator body to be analyzed is large at the location of the sensor. However, the exciting field of the coil may also be high at the location of the sensor.

Arranging the sensor means 18 and the electrical energy source 28 in a common casing or as parts of a common circuit allows easy synchronization of the electrical magnetic field source 14 and the sensor means 18. Exemplarily, a change in sign of the driving current at the electrical energy source 28 may be a triggering event (trigger) for the sensor means, which is provided to the sensor means 18 via a connection 42. The sensor means 18 and the electrical energy source 28 may, for example, be arranged on a chip in order to form a common circuit. The sensor means 18 may start detecting the fixed integral number of measuring values based on the triggering event. Alternatively, the sensor means 18 may, for example, provide a triggering event when starting again detecting the fixed integral number of measuring values to the electrical energy source 28 such that the electrical energy source 28 triggers a change in sign in the driving current based on the triggering results. In other words, in an embodiment shown in FIG. 2, the coil 14 may be arranged to form a unit together with the sensor 18.

When the electrical magnet field source 14 is provided with an electrical alternating current or an alternating direct current, the evaluating means 26 may be configured to sample the sensor signals 24 using a sample clock which is synchronized with a frequency of the electrical alternating voltage or the alternating direct current.

Although the position indicator 12 is illustrated as a ball, it is also conceivable for the position indicator 12 to be a non-symmetrical body or a partly symmetrical body, like a cube, or to generate an asymmetrical magnetic field. When the position indicator 12 generates a partly or completely asymmetrical magnetic field, a rotation of the position indicator 12 may, for example, also be recognized since superimposing the primary magnetic field 16p by the secondary magnetic field 16s generated by the position indicator 12 may depend on an orientation of the position indicator 12 in space.

A correlation between coil current and magnetic field 16 at the location of the sensors 22a-d is, when there is no position indicator 12, defined precisely by the geometry of the coil 14 and its location relative to the sensor means 18 and/or the sensors 22a-d and may remain constant when the sensor means 18 and the coil 14 are fixed relative to each other. The correlation between coil current and magnetic field 16 may thus be considered and/or corrected when evaluating the signals.

It is of advantage with this arrangement which may also be referred to as basic arrangement that an easy connection 42 between the sensor means 18 and the electrical magnetic field source 14 may be made, for example in order to synchronously allow a differential measurement of the magnetic field 16. The connection 42 may be used to excite the coil arrangement synchronously to the sensor 18 or vice versa to operate the sensor 18 synchronously to the coil excitation. In addition, the indicator field, i.e. a distortion of the magnetic field 16 by the position indicator 12 at the location of the sensors 22a-d, is relatively high. This means that the electrical magnetic field source 14 exhibits a relatively great distance to the position indicator. At the position of the position indicator 12, the magnetic field 16 or primary magnetic field 16p exhibits a comparatively low intensity based on the distance to the electrical magnetic field source 14 such that the secondary field 16s of the position indicator 12 relative to the primary field 16p is relatively large. The magnetic field 16, or primary magnetic field 16p, however, may be relatively large at the location of the evaluating means 18 and/or the sensors 22a-d, which may also have the effect of a disturbing field. When the sensors 22a-d are operated using large sensor dynamics in a range between $10^4$ and $10^{10}$, i.e. an order of magnitude of $10^6$ with a sensor range between 1 µT and 1 T, this may be compensated. Sensor dynamics describe a resolution limit at a given measuring duration and the possible measuring range resulting with one and the same circuit.

Figure 3:
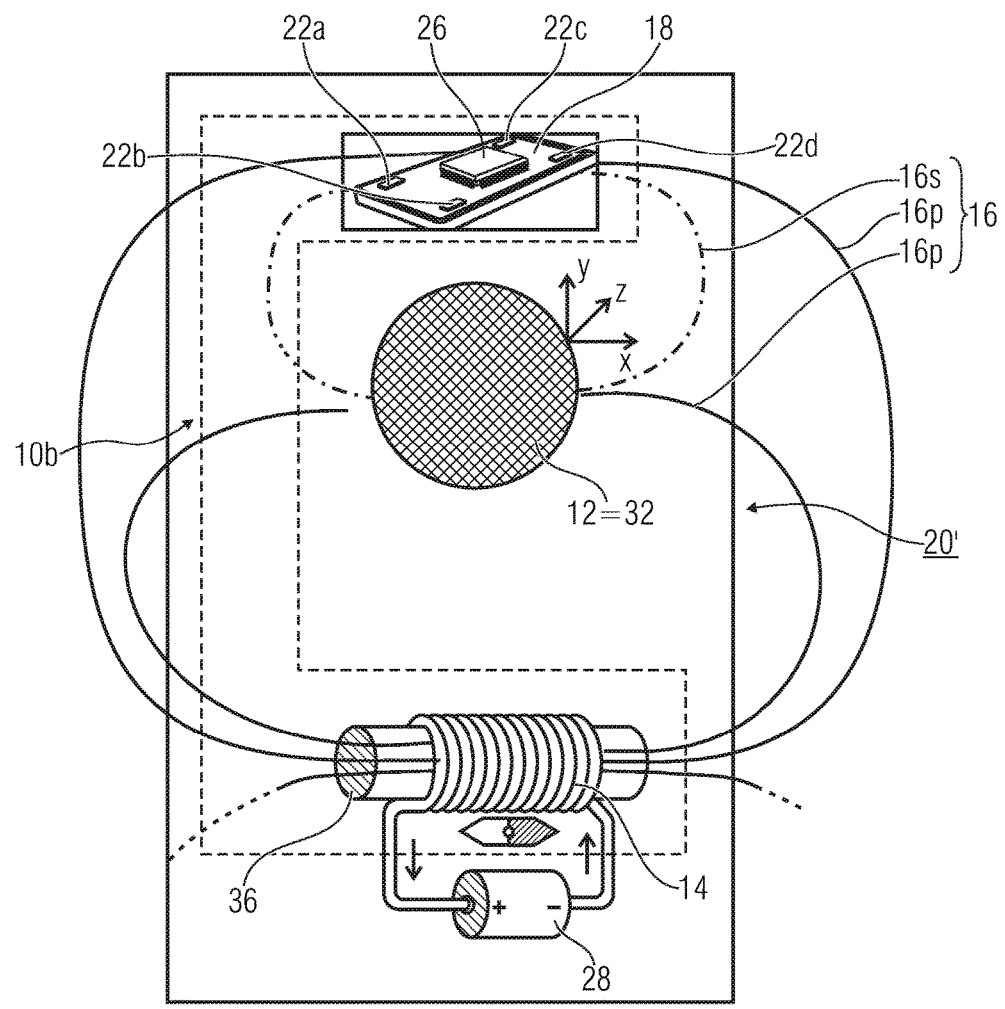
FIG. 3 shows a schematic illustration of a system having a device for detecting the position of the position indicator, wherein the position indicator is arranged between the sensor means and the electrical magnetic fields source.

FIG. 3 shows a schematic illustration of a system 20' comprising a device 10b for detecting the position of the position indicator 12. In the system 20', the movable element 32 is the position indicator 12.

The sensor means exhibits greater a distance to the electrical magnetic field source 14 than to the position indicator 12. In other words, the position indicator 12 is arranged between the sensor means 18 and the electrical magnetic field source 14.

In other words, an arrangement of the components in the device 10b, compared to an arrangement as is shown in FIG. 2 for device 10a, may exhibit an advantage as regards the relation between the stray field of the indicator and the exciting field of the coil which, due to the greater distance to the sensor, is considerably smaller. However, coil and sensor are no longer arranged to be spatially together, i.e. neighboring, which may result in higher a wiring and mounting complexity. The coil may possibly be excited, i.e. driven, by a separate circuit, which, however, may result in additional complexity for synchronizing the sensor means and coil excitation at the evaluating means, for example in chopper operation.

The magnetizable position indicator is located between the coil and the sensor. This may result in the exciting fields of the coil at the location of the sensor to be smaller, but the stray field of the position indicator, which is to be detected actually, at the location of the sensor to be relatively large compared thereto. Since the sensor and the coil are not located in direct proximity, synchronization of driving both circuit parts by a common control and evaluating circuit may be used for synchronization.

A mutually spaced-apart arrangement and, thus, a spatial separation of the electrical magnetic field source 14 and the sensor means 18 and/or evaluating means 26 may result in increased complexity as regards synchronizing the electrical magnetic field source 14 and the evaluating means 26 and/or sensor means 18, in particular when the components 14, 18 and/or 26 are implemented to be separate apparatuses in separate casings. Of advantage with this embodiment, compared to an arrangement as is illustrated exemplarily in FIG. 2, is a greater distance between the electrical magnetic field source 14 and the sensor means 18. This may result in smaller an influence of the sensor means 18 by the electrical magnetic field source 14 so that the sensors 22a-d may provide reliable sensor values, i.e. sensor values influenced less or uninfluenced by the electrical magnetic field source 14, even when using sensor dynamics smaller compared to the arrangement in FIG. 2.

Figure 4:
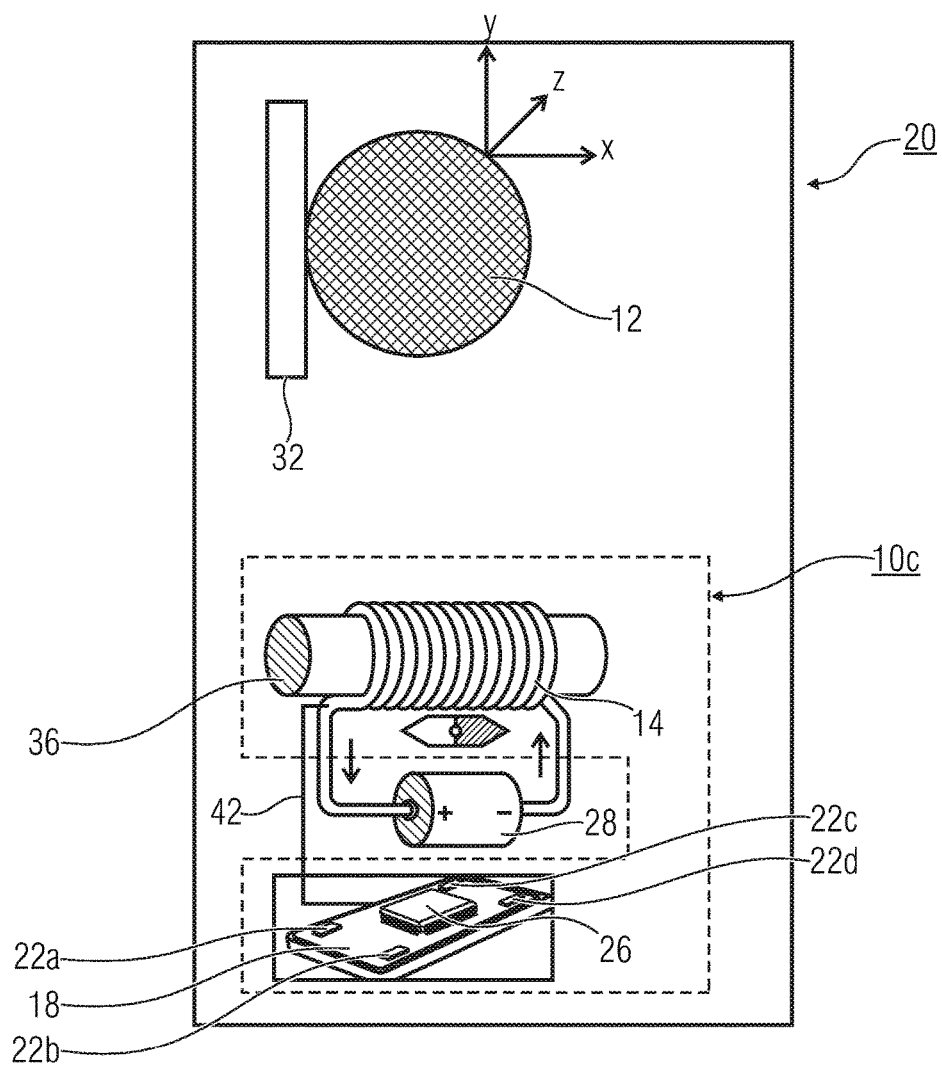
FIG. 4 shows a schematic illustration of the system having a device for detecting the position of the position indicator, where when the electrical magnetic field source is arranged between the sensor means and the position indicator.

FIG. 4 shows a schematic illustration of the system 20 in which the position indicator 12 exhibits greater a distance to the sensor means 18 than to the electrical magnetic field source 14. In other words, the electrical magnetic field source 14 is arranged between the position indicator and the sensor means 18.

The neighboring arrangement of the electrical magnetic field source 14 and the sensor means 18 or evaluating means 26 allows, as is illustrated in FIG. 2, easy connection 42 between the sensor means 18 and the electrical magnetic field source 14 and, thus, easier synchronization of exciting the electrical magnetic field source and detecting sensor data. A distortion of the magnetic field by the position indicator 12 at the location of the sensors 22a-d may be relatively small, based on the arrangement of the electrical magnetic field source 14 between the position indicator 12 and the sensors 22a-d. The disturbing field of the coil may be compensated when using higher sensor dynamics, like in Hall sensors, for example.

In other words, the coil and the sensor, as are shown in FIG. 2, for example, are arranged in direct proximity to each other. Based on the arrangement of the coil between the position indicator 12 and the sensor means 18, with equal size measures, the stray field of the indicator may be smaller or considerably smaller in relation to the exciting field of the coil, than in arrangements as are shown, for example, in FIG. 2 or FIG. 3. Such an arrangement may, for example, be an operative state of the device 10a when the position indicator 12 is movable in space over several dimensions and is moved to a location as is shown in FIG. 4. By suitably preprocessing the sensor signals, such states may be detected in which the exciter field of the coil is very large in relation to the stray field of the indicator which is to be measured actually. Although this arrangement may be unfavorable, it may be of advantage for the sensor and the coil to be located next to each other and thus to be mounted again as a unit.

Figure 5:
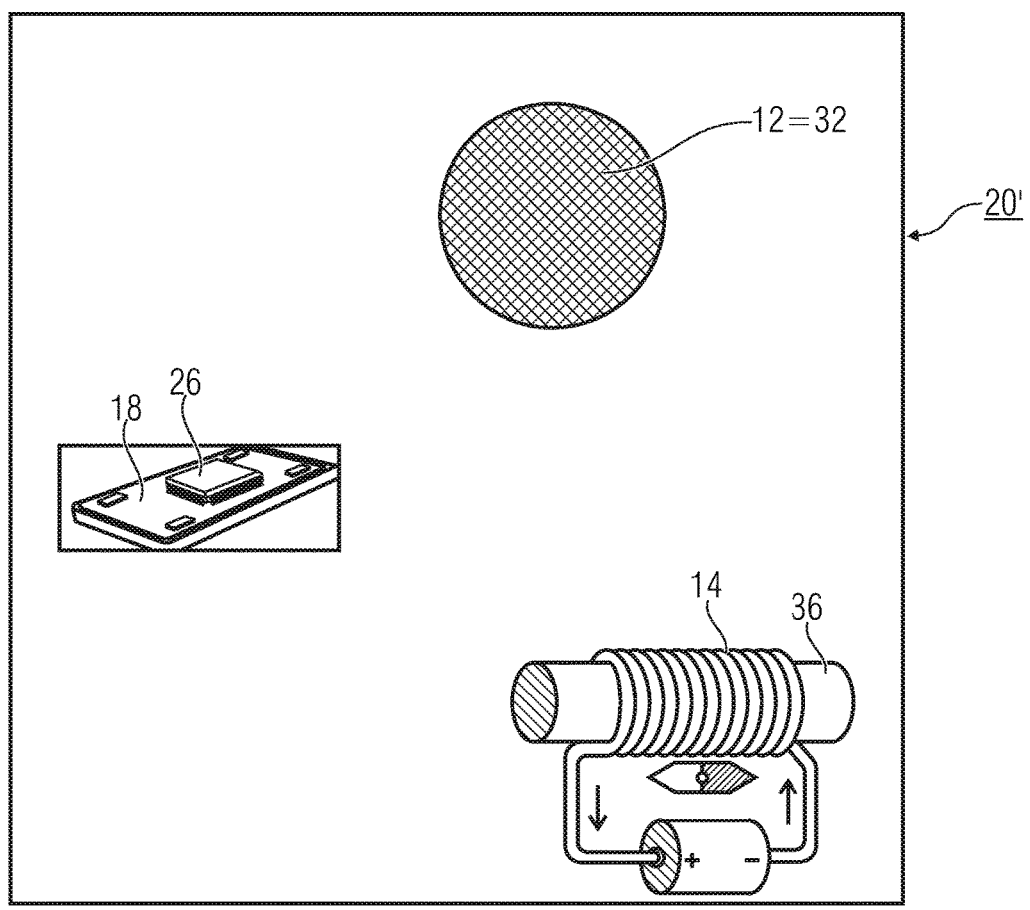
FIG. 5 shows a schematic illustration of the system in which the position indicator is a movable element of the system and in which the sensor means, the evaluating means and the electrical magnetic field source are distributed in the system in three spatial degrees of freedom.
Figure 6:
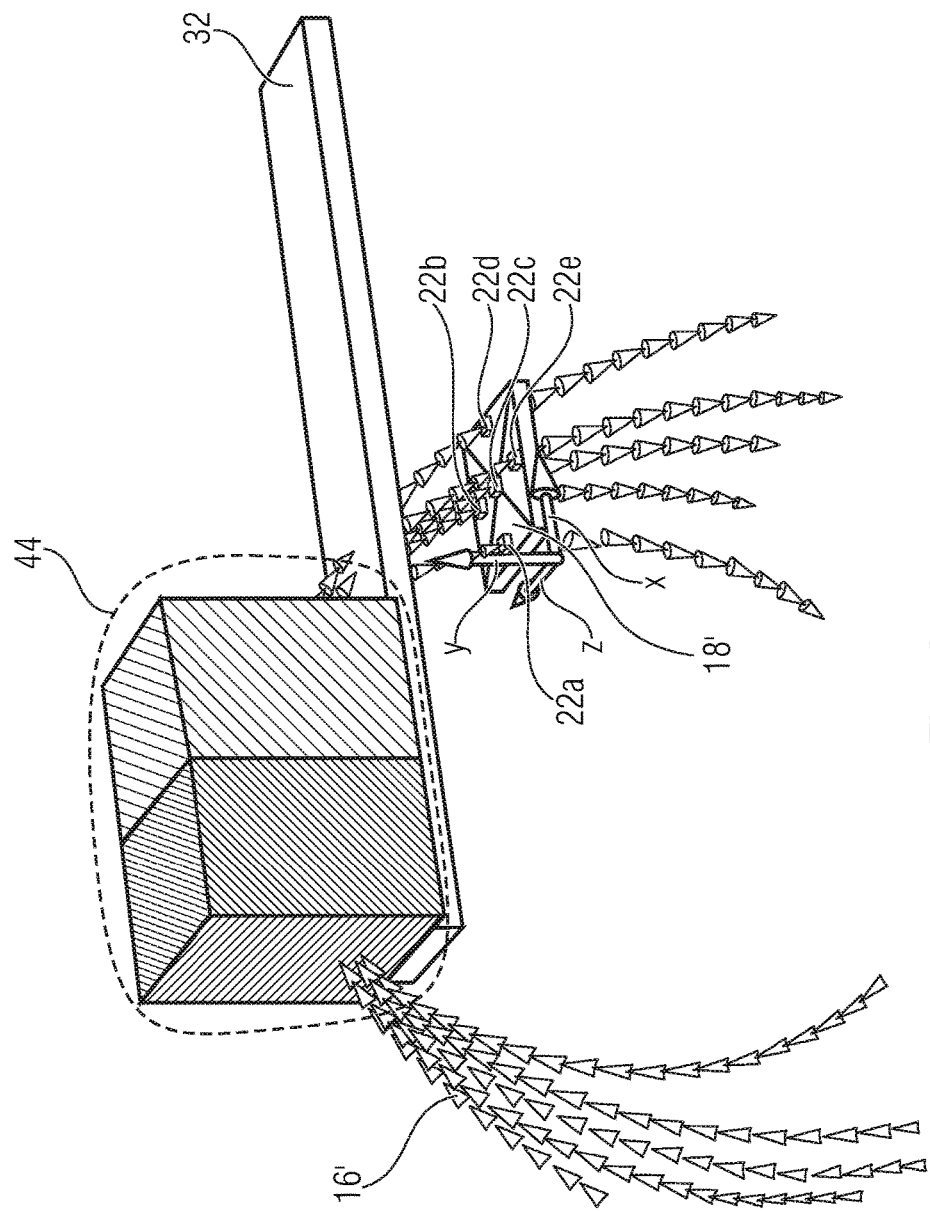
FIG. 6 shows a schematic illustration of a device for linear position measurement having 3D magnetic field sensors for recognizing the position of a body in a permanent magnetic field.

FIG. 5 shows a schematic illustration of the system 20' in which the position indicator 12 is the movable element 32, the sensor means 18, the evaluating means 26 and the electrical magnetic field source 14 are distributed in the system 20' in three spatial degrees of freedom. In principle, the electrical magnetic field source 14, the sensor means 18 and the position indicator 12 may exhibit any arrangement relative to one another.

In other words, the coil, sensor and indicator may in principle be arranged relative to one another as desired, for example when the arrangement is not limited to one plane, but when using all three spatial degrees of freedom. Detecting the respective efficiency may, for example, be done using power or performance measurements.

Some embodiments show an arrangement of the position indicator 12 to be closer to the sensor means 18 than the electrical magnetic field source 10. A distortion of the magnetic field by the position indicator 12 may be measured more clearly in this way. In addition, it may be of advantage to arrange the sensor means 18 and the electrical magnetic field source 14 to be arranged spatially close to each another such that easy synchronization of exciting the electrical magnetic field source 14 and measuring in the sensor means 18 is possible.

In addition, it may be of advantage for the sensor means 18 to be arranged between the electrical magnetic field source 14 and the position indicator 12 and at small a distance, i.e. as close to the position indicator 12 as possible, since the indicator field, i.e. the secondary magnetic field or distortion of the primary magnetic field (coil field) by the position indicator, at the location of the sensor means 18, will be the larger, the smaller the distance between the sensor means 18 and the position indicator 12.

In principle, the electrical magnetic field source 14 and sensor means 18 may exhibit a constant relative position to each other such that a relative position of the position indicator 12 may vary. Alternatively, the position indicator 12 and the sensor means 18 may exhibit a constant relative position to each other such that a relative position of the electrical magnetic field source 14 may vary. Alternatively, the position indicator 12 and the electrical magnetic field source 14 may comprise a position which may vary relative to a position of the sensor means 18. Alternatively or additionally, it is also conceivable for the position indicator 12, the sensor means 18 and the electrical magnetic field source 14 each to be arranged to be movable relative to one another.

Figure 7:
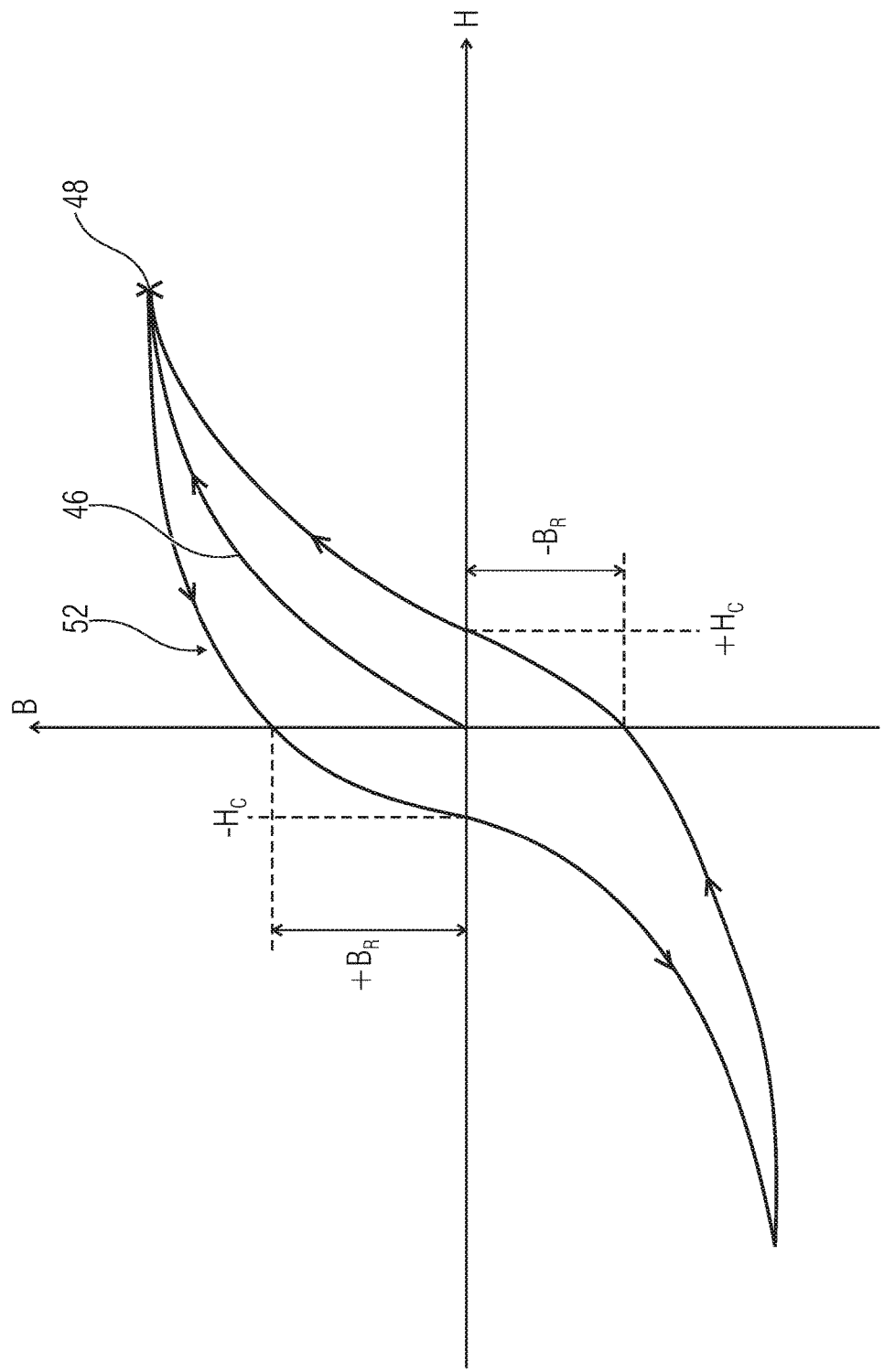
FIG. 7 shows a schematic illustration of a characteristic curve of hysteresis for illustrating the loses which may result based on remagnetization of position indicators.

FIG. 7 shows a schematic illustration of a hysteresis characteristic curve 52 for illustrating the losses which may result based on remagnetization of position indicators. An electrical current which is applied, for example, to an electrical coil may result in a magnetic field of a magnetic field strength H to be generated, which is illustrated on an abscissa of the graph. A remagnetized position indicator may be magnetized when being detected by a magnetic field of the magnetic field strength H, which is illustrated by means of a magnetic flux density B illustrated on the ordinate of the graph. A point 48 on the characteristic curve 52 represents a state of a magnetizable body in a magnetic field H.

When the magnetized position indicator is removed from the magnetic field or the magnetic field is removed from the position indicator, i.e. when "going", starting from point 48, along the direction of arrow on the external envelope 52 in the direction of an abscissa value of zero (H=0), a remaining flux density, the remanence magnetization $B_R$, may remain in the position indicator. In order to de-magnetize the position indicator, a magnetic field of reverse polarization direction has to be applied up to a value of a negative coercive field strength ($-H_C$) such that an ordinate value of zero (B=0) is obtained. When further increasing a magnitude of the H field in the negative polarization direction, the position indicator is magnetized in an opposite direction so that, after removing the magnetic field, a negative remanence magnetization ($-B_R$) remains, which is removed only after applying a magnetic field of a coercive field strength ($+H_C$). A further increase in the field strength H may result in the point 48 to be reached again. An area of the overall curve is a measure of the power loss occurring during a remagnetization cycle.

Figure 8:
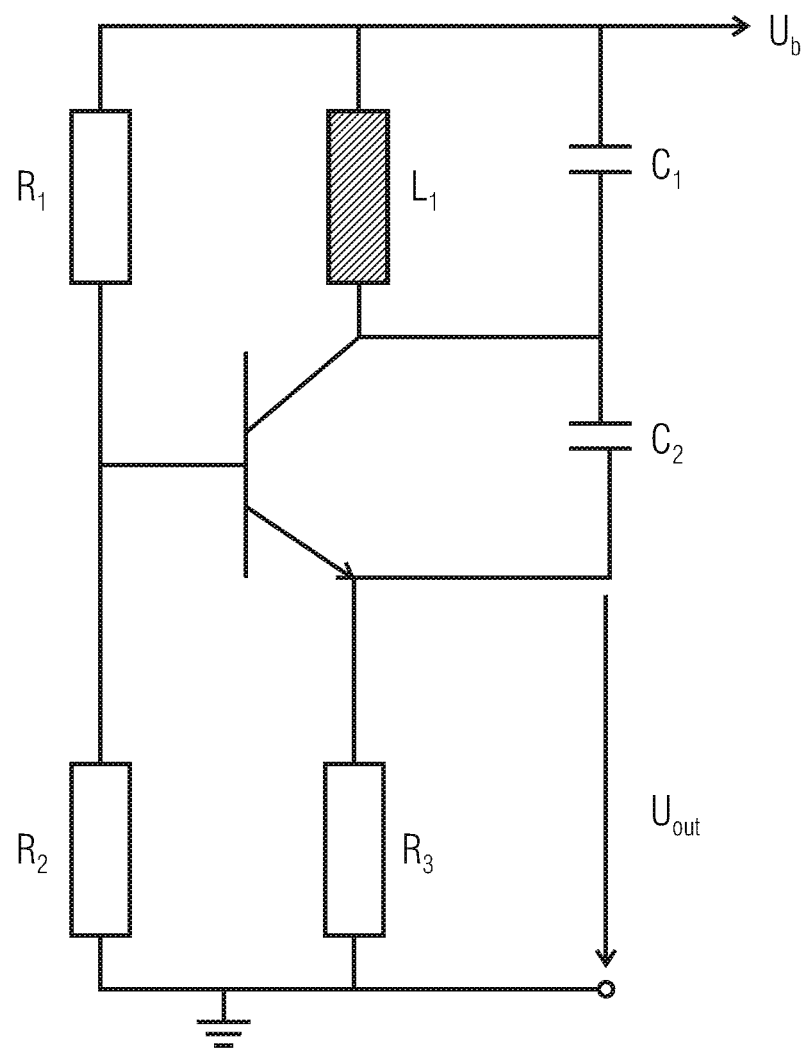
FIG. 8 shows an exemplary circuit diagram of a Colpitts oscillator.

FIG. 8 shows an exemplary circuit diagram of a Colpitts oscillator. An output voltage here may oscillate harmonically at a resonant frequency, wherein the resonant frequency may be adjusted based on the inductance $L_1$, the capacitance $C_1$ and the capacitance $C_2$ and an amplitude in dependence on the supply voltage $U_b$ and a ratio of the resistances $R_1$, $R_2$ and $R_3$.

Figure 9A:
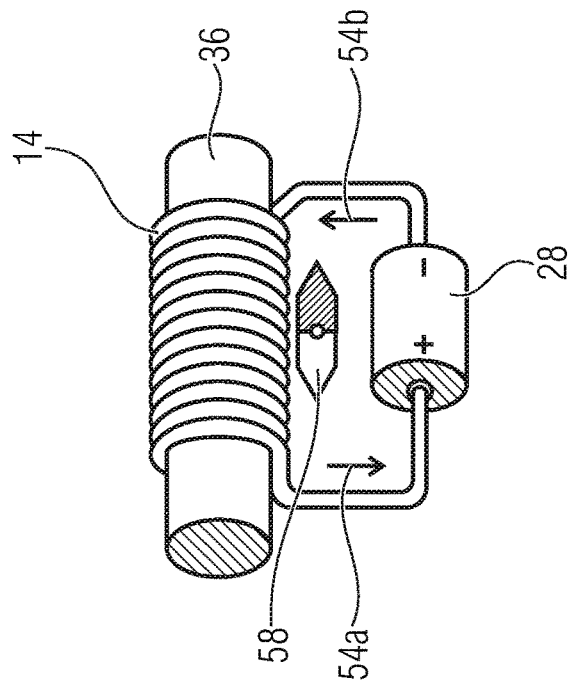
FIG. 9a shows an electrical magnetic source implemented as a wound coil, comprising a ferromagnetic core and connected to an electrical energy source.

FIG. 9a shows an electrical magnet source 14 implemented as a wound coil which comprises the ferromagnetic core 36 and is supplied with an electrical current flowing along direction arrows 54a and 54b by an electrical energy source 28 represented as a battery. Based on the direction of the current flow, a magnetic field propagates along a direction, as is illustrated by arrows 56a and 56b. This may result in a magnetic field having an orientation along the coil core 36, as is illustrated schematically by a compass needle 58 the north pole of which is directed to the left.

Figure 9B:
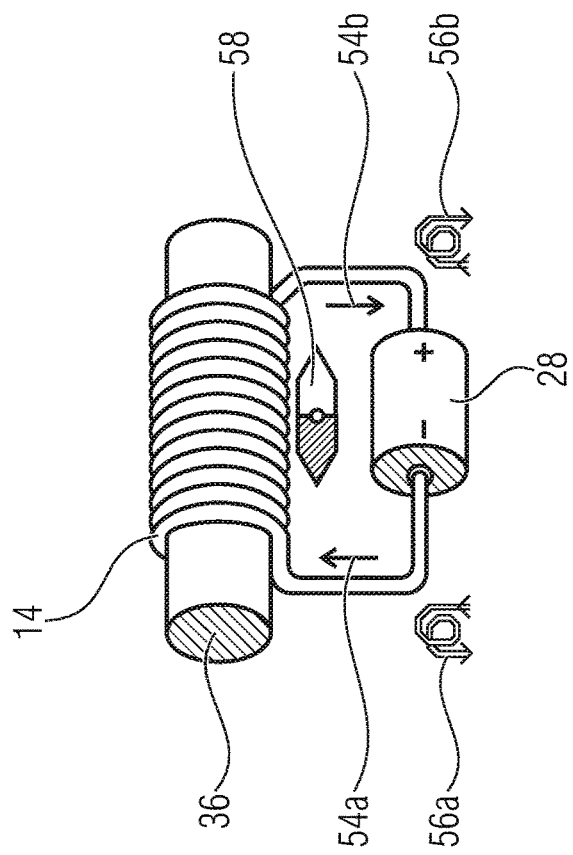
FIG. 9b shows the arrangement of the electrical magnetic field sources of FIG. 9a in which polarity of the electrical energy source has been reversed.

FIG. 9b shows the arrangement of an electrical magnetic field source 14 with a ferromagnetic core 36 and the electrical energy source 28 from FIG. 9a in which a polarity of the electrical energy source 28 has been reversed. This results in the direction arrows 54a and 54b which indicate the current direction to be reversed compared to FIG. 9a. The result from this is a magnetic field with a polarity reversed compared to FIG. 9a, as is indicated by the compass needle 58 the north pole of which is directed to the right and, thus, points in a direction reversed compared to FIG. 9a.

Figure 10:
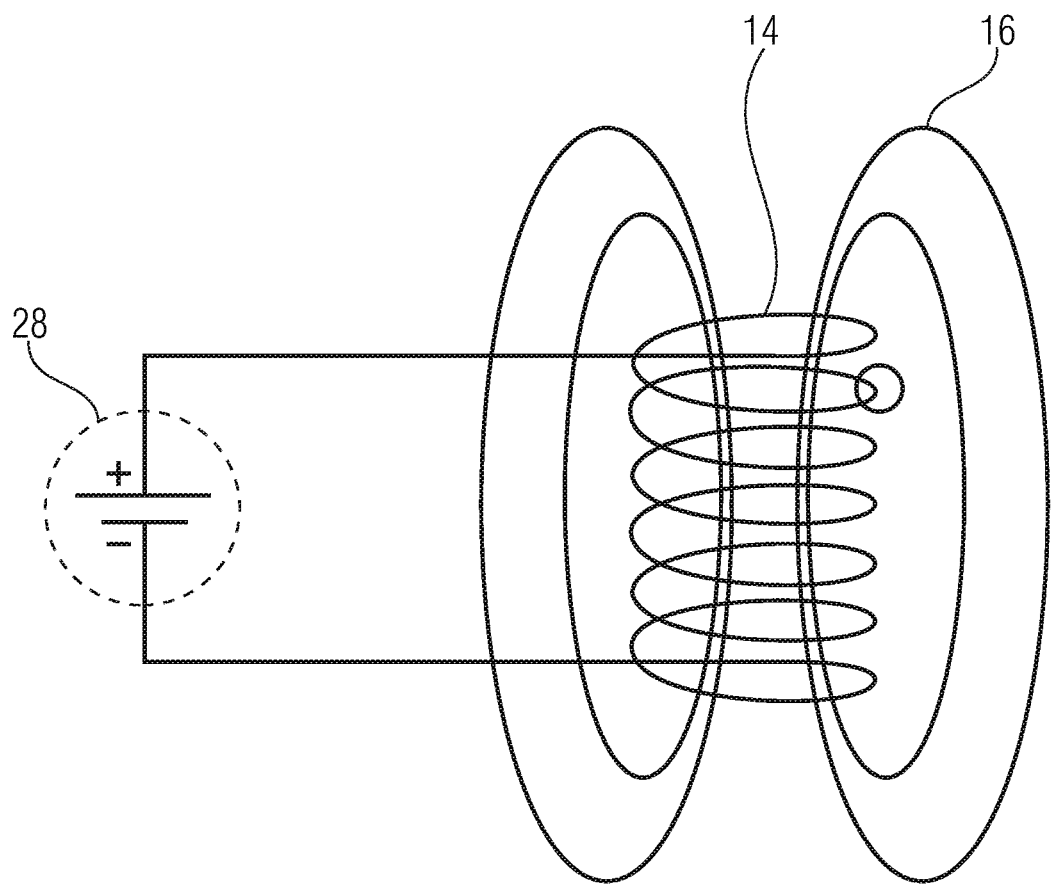
FIG. 10 shows an alternative schematic illustration of an electrical magnetic field source implemented as a coil and connected to the electrical energy source.

FIG. 10 shows a schematic illustration of an electrical magnetic field source 14 which is implemented as a coil and connected to the electrical energy source 28 which is implemented as a direct voltage source. The magnetic field 16 generated in this way comprises approximately parallel field lines within the coil. A ferromagnetic core for amplifying the magnetic flux may be arranged along this parallel structure. In the surroundings, i.e. outside the coil 14, the field lines of the magnetic field 16 exhibit a non-parallel course. A position of the position indicator and/or the conducting object, like the short-circuited coil, may be detected in the surroundings of the electrical magnetic field source 14.

As has already been mentioned above, the evaluating means may be configured to implement evaluation similar to a chopper method or a lock-in method.

The chopper method is based on artificially adding a change in sign in a signal of essentially direct voltage character. This means that the signal exhibits an amplitude value which changes slowly relative to a measuring frequency. Irrespective of this, the amplitude may exhibit a change in sign. The signal is detected in portions in a period of time based on a chopper frequency and, in a subsequent period of time, provided with a change in sign so that an alternating voltage may be generated based on chipping. The amplitude may correspond to the amplitude of the original signal. The alternating voltage signal formed in this way may be amplified using an alternating current (AC) amplifier, wherein the amplitude amplified in this way may subsequently be rectified again. Of advantage with this method is the fact that no special offset-free amplifier is required since signal information of the original signal in the alternating current signal is located on a carrier frequency (the scrambling frequency) and same may be processed and, maybe, filtered using the AC amplifier.

The lock-in method may also be referred to as a phase-sensitive rectifier in which a noised signal may be extracted exhibiting a useful signal which has smaller amplitudes compared to the noise signal, for example 0.5, 0.2 or 0.1 times the amplitude of the noise signal. The noise signal may, for example, be implemented by the primary magnetic field 16$p$, the useful signal by distortions of the position indicator 12 and, thus, by the secondary magnetic field 16$s$, for example. With phase-correct multiplication of the signal received at the evaluating unit 18 by the switching signal, i.e. a signal using which the electrical magnetic field source 14 is driven, an output signal may be obtained which corresponds to a portion of the input signal which is in phase with modulation (excitation signal), rectified and averaged over the time constant of the frequency applied.

This may, for example, be a factor, like $\sqrt{2}$ of the useful signal. In the method, the relative phase between the signal to be detected and the synchronization signal may be very important since, for example, a phase offset of 90° (cf. cosine (0)=1; cosine (90°) equaling 0) may have the result that a useful signal of a zero amplitude is extracted.

Basically, the lock-in method is a method for demodulating a useful signal which is superimposed by a noise disturbance and/or carrier signal.

Although some aspects have been described in the context of a device, it is clear that these aspects also represent a description of the corresponding method, such that a block or element of a device also corresponds to a respective method step or a feature of a method step. In analogy, aspects described in the context of or as a method step also represent a description of a corresponding block or detail or feature of a corresponding device.

Depending on specific implementation requirements, embodiments of the invention may be implemented in either hardware or software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer-readable.

Some embodiments according to the invention include a data carrier comprising electronically readable control signals capable of cooperating with a programmable computer system such that one of the methods described herein is performed.

Generally, embodiments of the present invention may be implemented as a computer program product with program code, the program code being operative for performing one of the methods when the computer program product runs on a computer. The program code may for example be stored on a machine-readable carrier.

Other embodiments comprise the computer program for performing one of the methods described herein, wherein the computer program is stored on a machine-readable carrier.

In other words, an embodiment of the inventive method, thus, is a computer program comprising a program code for performing one of the methods described herein, when the computer program runs on a computer. A further embodiment of the inventive methods, thus, is a data carrier (or a digital storage medium or a computer-readable medium) onto which is recorded the computer program for performing one of the methods described herein.

A further embodiment of the inventive method, thus, is a data stream or a sequence of signals representing the computer program for performing one of the methods described herein. The data stream or the sequence of signals may for example be configured to be transferred via a data communication connection, for example via the Internet.

A further embodiment comprises processing means, for example a computer, or a programmable logic device, configured or adapted to perform one of the methods described herein.

A further embodiment comprises a computer having installed thereon the computer program for performing one of the methods described herein.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, in some embodiments, the methods may be performed by any hardware apparatus. This can be a universally applicable hardware, such as a computer processor (CPU), or hardware specific for the method, such as an ASIC.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A device for detecting a position of a position indicator, comprising:
    an electrical magnetic field source configured to generate a magnetic field when an electrical current flows through the electrical magnetic field source;
    a sensor configured to detect the magnetic field and provide sensor signals based on the magnetic field detected, the sensor comprising at least two 3D sensors each of which is configured to detect three spatial direction components of the magnetic field and output a signal corresponding to the respective spatial direction component;

an evaluator configured to receive the sensor signals and determine the position of the position indicator based on the sensor signals when the magnetic field in the surroundings of the electrical magnetic field source is influenced by the position indicator;

wherein the evaluator is configured to differentially measure, for determining the position of the position indicator, the magnetic field using the sensor signals of the at least two 3D sensors;

wherein the device comprises an electrical energy source configured to provide the electrical magnetic field source with an electrical alternating current, and wherein the evaluator is configured to sample the sensor signals using a sample clock, wherein the sample clock and a frequency of the electrical alternating voltage are synchronized; or wherein the electrical magnetic field source is a coil and comprises a ferromagnetic coil core configured to amplify the magnetic field generated by the electrical magnetic field source.

2. The device in accordance with claim 1, comprising the electrical energy source and further comprising an electrical capacitor connected to the electrical magnetic field source such that the electrical magnetic field source and the electrical capacitor form an electrical oscillating circuit comprising a resonant frequency, wherein the electrical energy source is configured to excite the oscillating circuit at its resonant frequency.

3. The device in accordance with claim 1, comprising the electrical energy source, wherein the electrical energy source is configured to provide the electrical magnetic field source with a discontinuous alternating voltage of alternating sign.

4. The device in accordance with claim 1, wherein the evaluator is configured to determine the position of the position indicator based on a lock-in method or a chopper method by excluding a potentially disturbing external field from a differential measurement of the magnetic field with an exciter current of positive or negative sign at the electrical magnetic field source.

5. The device in accordance with claim 1, wherein the electrical magnetic field source and the sensor comprise a constant relative position to each other.

6. The device in accordance with claim 1, wherein the position indicator and the sensor comprise a constant relative position to each other.

7. The device in accordance with claim 1, wherein the position indicator and the sensor comprise a position variable relative to a position of the electrical magnetic field source.

8. A system comprising a device for detecting a position of a position indicator in accordance with claim 1 and an element movable relative to the sensor or the electrical magnetic field source, the movable element being connected to the position indicator or the movable element being the position indicator;

wherein the position indicator comprises greater a distance to the electrical magnetic field source than to the sensor.

9. The system in accordance with claim 8, wherein the electrical magnetic field source and the sensor comprise a constant relative position to each other.

10. The system in accordance with claim 8, wherein the position indicator and the sensor comprise a constant relative position to each other.

11. The system in accordance with claim 8, wherein the position indicator and the sensor comprise a position variable relative to a position of the electrical magnetic field source.

12. A system comprising a device for detecting a position of a position indicator in accordance with claim 1, wherein the sensor and the electrical magnetic field source are arranged in a common casing.

13. The system in accordance with claim 12, wherein the electrical magnetic field source and the sensor comprise a constant relative position to each other.

14. The system in accordance with claim 12, wherein the position indicator and the sensor comprise a constant relative position to each other.

15. The system in accordance with claim 12, wherein the position indicator and the sensor comprise a position variable relative to a position of the electrical magnetic field source.

16. A system comprising a device for detecting a position of a position indicator in accordance with claim 1 and an element movable relative to the sensor or the electrical magnetic field source, the movable element being connected to the position indicator or the movable element being the position indicator;

wherein the sensor comprises a greater distance to the electrical magnetic field source than a distance between the sensor and the position indicator.

17. The system in accordance with claim 16, wherein the electrical magnetic field source and the sensor comprise a constant relative position to each other.

18. The system in accordance with claim 16, wherein the position indicator and the sensor comprise a constant relative position to each other.

19. The system in accordance with claim 16, wherein the position indicator and the sensor comprise a position variable relative to a position of the electrical magnetic field source.

20. A device for detecting a position of a position indicator, comprising:

an electrical magnetic field source generating a magnetic field when an electrical current flows through the electrical magnetic field source;

a sensor configured to detect a magnetic field and to provide sensor signals based on the magnetic field detected, the sensor comprising at least two Hall sensors for detecting three spatial direction components of the magnetic field influenced by the position indicator, the sensors being configured to output a signal corresponding to the respective spatial direction component;

an evaluator configured to receive the sensor signals and determine the position of the position indicator based on the sensor signals when the magnetic field in a surroundings of the electrical magnetic field source is influenced by the position indicator;

wherein the device comprises an electrical energy source configured to provide the electrical magnetic field source with an electrical alternating current, and wherein the evaluator is configured to sample the sensor signals using a sample clock, wherein the sample clock and a frequency of the electrical alternating voltage are synchronized; or wherein the electrical magnetic field source is a coil and comprises a ferromagnetic coil core configured to amplify the magnetic field generated by the electrical magnetic field source.

21. The device in accordance with claim 20, wherein the at least two Hall sensors are arranged to be spaced apart from one another and configured to detect an equal spatial direction component of the magnetic field and to output a signal corresponding to the spatial direction component.

22. A method for detecting a position of a position indicator, comprising:
  generating a magnetic field by means of an electrical current by providing an electrical magnetic field source with an electrical alternating current using an electrical energy source, and sampling the sensor signals using a sample clock, wherein the sample clock and a frequency of the electrical alternating voltage are synchronized; or using an electrical magnetic field source being a coil and comprising a ferromagnetic coil core configured to amplify the magnetic field generated by the electrical magnetic field source;
  detecting three spatial direction components of the magnetic field and providing sensor signals corresponding to the respective spatial direction components based on the magnetic field detected;
  receiving the sensor signals and determining the position of the position indicator based on the sensor signals by differentially measuring the magnetic field using the sensor signals of the at least two 3D sensors.

* * * * *